United States Patent [19]

Fisher

[11] Patent Number: 5,876,655
[45] Date of Patent: Mar. 2, 1999

[54] METHOD FOR ELIMINATING FLOW WRINKLES IN COMPRESSION MOLDED PANELS

[75] Inventor: John M. Fisher, Algonac, Mich.

[73] Assignee: E. I. du Pont de Nemours and Company, Wilmington, Del.

[21] Appl. No.: 894,525

[22] PCT Filed: Feb. 21, 1995

[86] PCT No.: PCT/US95/01519

§ 371 Date: Aug. 21, 1997

§ 102(e) Date: Aug. 21, 1997

[87] PCT Pub. No.: WO96/26061

PCT Pub. Date: Aug. 29, 1996

[51] Int. Cl.[6] .................................................. B29C 43/04
[52] U.S. Cl. ........................ 264/319; 264/322; 264/323
[58] Field of Search ................................... 264/257, 258, 264/320, 322, 319, 323

[56] References Cited

U.S. PATENT DOCUMENTS

| | | | |
|---|---|---|---|
| 4,225,553 | 9/1980 | Hirota et al. | 264/292 |
| 4,524,043 | 6/1985 | McDougal | 264/320 |
| 4,624,814 | 11/1986 | McDougal | 264/137 |
| 4,647,418 | 3/1987 | McDougal | 264/137 |
| 4,986,948 | 1/1991 | Komiya et al. | 264/257 |
| 5,030,402 | 7/1991 | Zachariades | 264/323 |
| 5,047,198 | 9/1991 | Kim | 264/257 |
| 5,093,067 | 3/1992 | Gibson | 264/257 |
| 5,134,016 | 7/1992 | Geary, Jr. et al. | 428/198 |
| 5,178,708 | 1/1993 | Hara et al. | 156/242 |
| 5,178,908 | 1/1993 | Hara et al. | 264/257 |
| 5,304,338 | 4/1994 | Hertel et al. | 264/328.4 |
| 5,714,105 | 2/1998 | Gysin et al. | 264/257 |

*Primary Examiner*—Jill L. Heitbrink
*Attorney, Agent, or Firm*—H. L. Fricke

[57] ABSTRACT

A large surface shaped structure having a smooth surface is formed by compression molding a charge (26) of reinforced molding material containing a thermoplastic material by placing a heated mold charge (26) in a mold (12, 14) which has its peripheral surfaces spaced apart to provide a shear gap (34). The width of the shear gap (34) is adjusted to accept a quantity of molding material sufficient to dissipate residual energy in the flow front of the charge to prevent rebound of the flow front as the structure solidifies.

9 Claims, 1 Drawing Sheet

METHOD FOR ELIMINATING FLOW WRINKLES IN COMPRESSION MOLDED PANELS

FIELD OF THE INVENTION

This invention relates to a process for the manufacture of products from reinforced thermoplastic materials, more particularly to a method to eliminate flow rippling in molded reinforced thermoplastic parts having large surface areas.

BACKGROUND OF THE INVENTION

Plastics continue to replace metals as materials of construction. The cost savings of plastics over metals combined with the ease of manufacturing and weight savings provide combined impetus for plastic's invasion into the metal field.

Plastics can be fabricated into a variety of geometric designs possessing a wide range of strengths. Indeed, plastics can now be fabricated as replacements for external, semistructural metal members such as automobile hoods, deck lids, roofs and fender extensions. Reinforced thermoplastic molding compounds have shown increased acceptance in recent years due to their lighter weight, lack of outgasing during painting and ease of recyclability. This is in contrast to thermosetting compounds which do not possess the aforementioned attributes.

Of the conventional methods of making plastic parts, including semistructural plastic parts, automatic and semiautomatic molding techniques have proven most popular because of their high production rates, lower manpower costs and improved product uniformity. One of the more popular semiautomatic molding processes is the method known as compression molding. The mold charge is molded upon closing of the mold members as the material flows into the open cavity. Smooth, aligned surfaces, about the perimeter of the male and female mold members, called shear edges, slide together and effect a "pinch off" around the perimeter of the mold to stop the major flow of molding compound from the mold cavity. The edge opening, or shear edge gap, located at the peripheral edges of the mold, is typically on the order of 0.0508 to 0.127 mm (0.002 to 0.005 inch) in width. The gap is purposely kept very small, i.e. just large enough to permit closing of the mold without binding and small enough to prevent any substantial escape of the molding charge from the molding cavity. Unfortunately, in using the small shear edge gap, the surface of such parts, as molded, have an unacceptable appearance and must be hand finished. Wrinkling of the surface is apparent.

During the mold filling step, pressure forces the molding compound to flow and fill out the cavity of the mold. When the molding compound reaches the shear edge, it is very close to the freezing or solidification point of the resin. As the flow impacts the shear edge "wall", the residual energy associated with the flow causes the molding compound to rebound and attempt to flow back into the oncoming flow front, in turn buckling reinforcing material in the molding compound. The buckled reinforcing material becomes frozen in the solidifying matrix resin. As the composition continues to solidify, the buckled reinforcing material begins to show through to the surface of the molded part. This "flow rippling" typically manifests itself as a series of waves with amplitudes as high as 25 microns and a frequency of 1500 to 3000 microns. It generally occurs at or near the shear edges in a compression molded part and is visible to the naked eye both before and after painting. Consequently, products with such surface deformations must be hand-finished prior to painting, which is expensive and time-consuming. Even with hand-finishing, the scrap rate for such molded parts may be as high as 50 percent.

Flow ripples have been documented in several different mold configurations, e.g. round, square and contoured parts. Attempts to solve this problem have been made by altering the resin used as well as changing the reinforcing materials. Statistical testing of the major processing variables showed no significant effect on the magnitude or occurrence of the flow ripples present in the final molded part.

SUMMARY OF THE INVENTION

Pursuant to the present invention, reinforced thermoplastic parts are compression molded which are free from flow ripple patterns. Significant post finishing is eliminated with a corresponding increase in productivity and a decrease in cost for a final product.

In carrying out the present invention, a molding charge comprised of a plurality of layers of randomly dispersed high modulus reinforcing fibers held together by a solidified thermoplastic resin matrix is heated above the melting point of the resin and placed within a set of cooperating dies which form a mold cavity. The peripheral edges of the surfaces are spaced apart to provide a substantial shear gap around the periphery of the mold. When brought together during the molding process, the pressure generated in the molding dies forces the molding charge to flow and fill the cavity of the mold. A flow front is formed and a quantity of the molding charge is forced into the shear edge at the periphery of the dies. The shear edge is large enough to receive a quantity of the molding charge which is capable of dissipating residual energy from the flow front as the molding material solidifies. If the shear edge is too small, the molding material rebounds from the shear edge into the oncoming flow front of the material. This rebound movement buckles the reinforcing component within the flowing material. The buckled reinforcement reads through the finished molded part as flow ripples.

If flow ripples are observed, the shear edge is adjusted to increase the gap between the cooperating die edges. The shear edge gap is increased to allow less hindered flow of molding material from the cavity of the mold into the shear gap as the resin material solidifies. The size of the gap required is dependent upon the characteristics of the components of the molding charge, the mold temperature, the mold closing speed and the required molding composition pressure.

DETAILED DESCRIPTION OF THE INVENTION

Figure 1:
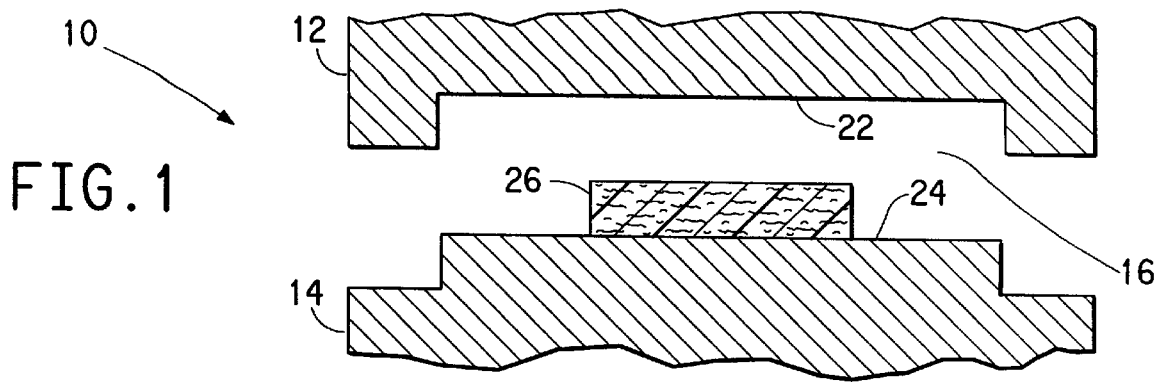
FIG. 1 is a schematic representation of the upper and lower dies of a mold showing a molding charge placed upon the molding surface of the lower die.

Referring to the drawings, FIG. 1 shows mold 10 having an upper die 12 and a lower die 14 with opposing molding surfaces 22 and 24 cooperating to define molding cavity 16. Molding surfaces 22 and 24 define mold cavity 16 and determine the shape of the part to be fabricated.

Upper die 12 is typically connected to a mobile platen, not shown, operating under the action of a ram or like device to control relative movement between upper die 12 and lower die 14. The manner of controlling the die movement is well within the skill of the ordinary practitioner.

In the open position, dies 12 and 14 are spaced apart to allow mold charge 26 to be placed on molding surface 24 of lower die 14. The term "charge" refers to a material containing reinforcing material, other adjuvants such as fillers, antioxidants and pigments, and one or more thermoplastic resins that solidifies to provide a rigid, solid article. The resin that may be used can be any material that provides the necessary bonding and strength for the article to be formed such as thermoplastic polyesters, polyethylene, polypropylene, copolyesters, polyamides, including Nylon 6, Nylon 6/6, Nylon 11, Nylon 12, J2, polyethertherketone (PEEK), polyetherketoneketone (PEKK), polymethyphenylene, polyarylates and polyvinylidene fluoride. These resins can be combined with reinforcing fibers or fillers at concentrations from about 5% to 50% by weight by a variety of methods to produce a reliable high modulus molded panel. Preferred resin materials are thermoplastic polyester resins.

Reinforcing material may be any high modulus fiber such as polyamides, glass, carbon, polyesters and high temperature nylons. Fibers having a modulus of at least 100,000M Pascals are preferred.

The present invention finds particular utility for compression molding charges in the form of one or more sheets of sheet molding compound materials of the type disclosed in Geary and Weeks, U.S. Pat. No. 5,134,016 and European Patent No. 0 341 977 granted Feb. 16, 1994, the disclosures of which are incorporated herein by reference. Such material includes a thermoplastic resin mixed with reinforcing fibers and various fillers to form a porous semi solid sheet or ply that can be cut into desired shapes and placed in a mold. Typical reinforcing fibers include polyimide fibers, polyester fibers, polyamide fibers, natural fibers and metal fibers. Preferably, the fibers are glass fiber strands.

Figure 2:
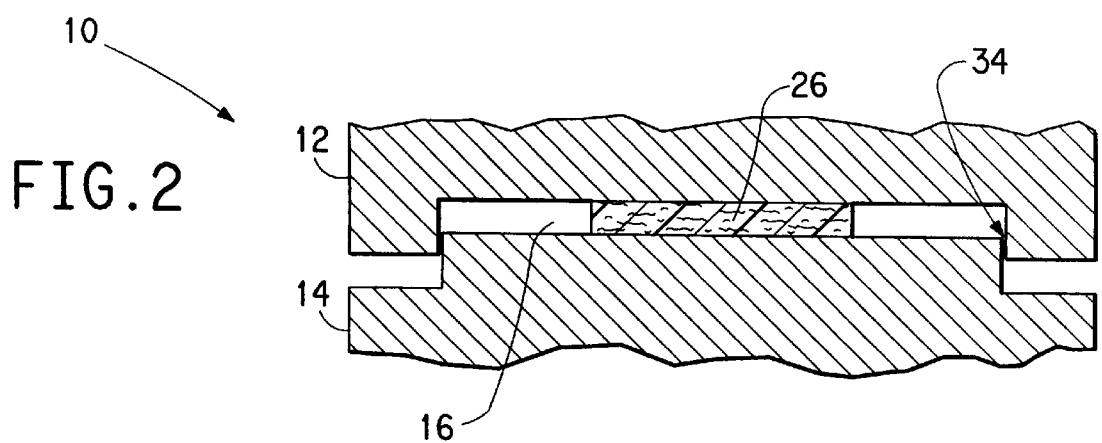
FIG. 2 is a schematic representation of the mold of FIG. 1 in a partially closed position.

In FIG. 2, mold charge 26 is formed from sheets of fiber reinforced thermoplastic material. The thickness, weight and placement of the charge on the molding surface will depend on the desired configuration of the final part. In general, the charge should be centrally located with little or no space being left between individual sheets if multiple sheets are used. Mold charge 26 is heated to a temperature above the melting point of the matrix resin by using a forced hot air convection oven or other suitable preheating technology. Heated mold charge 26 is then placed on molding surface 24 of mold 16.

Figure 3:
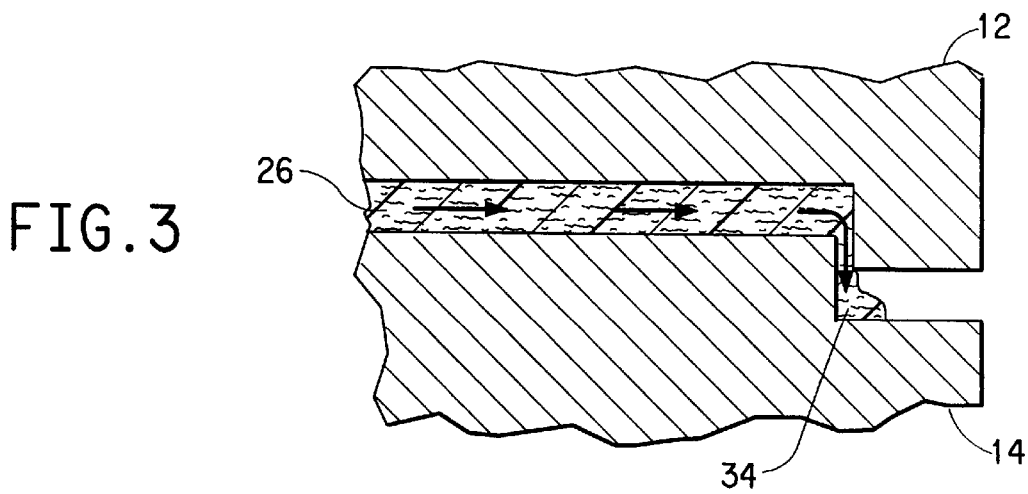
FIG. 3 is a schematic representation of the mold of FIG. 1 in the closed position showing the molding charge flowing into the shear gap at the edge of the mold.

As shown in FIG. 2, dies 14 and 16 are moved toward each other to a fully closed position. During the mold closing step, upper die 12 contacts mold charge 26, causing it to spread and fill mold cavity 16. Mold charge 26 fills cavity 16 and flows into shear gap 34 as shown in FIG. 3. The point in time when mold charge 26 reaches the edge of shear gap 34 is very close to the freezing or solidification point of the matrix resin of mold charge 26. By controlling the width of shear gap 34 the residual energy associated with the flowing resin is dissipated in shear gap 34 and the flowing resin does not rebound into the flow front of the mold charge. The width of shear edge gap 34 is dependent upon the composition of the mold charge used, including the thermoplastic resin and the concentration of the reinforcing fiber and filler. The size of the shear gap cannot be too small since this will not allow for dissipation of the residual energy of the molding material as it flows through the cavity and reaches the shear gap. Likewise, an oversized shear gap will not allow the proper buildup of pressure within the mold needed to consolidate the part resulting in an excessive amount of charge material 26 being forced out of molding cavity 16. The width of the shear gap for a polyethylene terephthalate containing molding composition is generally between 0.381 to 0.762 mm (0.015 to 0.030 inch).

After the resin solidifies sufficiently to permit handling, molds 14 and 16 are separated to permit ejection or removal of the molded part. Typically, the mold dwell time for a part 0.254 mm (0.100 inch) thick is from 20 to 60 seconds.

The invention will be further illustrated by the following indicated. Units reported throughout the specification and claims in SI units have been converted from the English system to the SI System.

EXAMPLE

A self-supporting porous batt was prepared from polyethylene terephthalate (PET) fiber having an as spun denier of 1.5. The fiber was converted to a staple length of 0.635 cm and intimately mixed with 1.27 mm (0.5 inch) long glass fibers having a diameter of about 0.013 mm. The above ingredients were slurried in water and collected as a mat on a moving belt from a paper machine head box, then conveyed to a dryer. The mat consisted of 25% (nominal) glass fiber (Owens Corning Fiberglass "K"), 74.75% PET fiber and 0.25% "Irganox" 330 (Ciba Geigy antioxidant). A belt speed of 7.62 m/m and a dryer temperature of 280° C. was used to premelt the PET fibers into droplets, distributed along the glass fibers. A sheet having a basis weight of 0.444 kg/sqcm was obtained.

A cutting die was used to convert the sheet material into 17.78 cm (7.0 inches) diameter circular pieces to cover approximately 48% of the net surface area of a compression mold. Numerous pieces were stacked to achieve a preform weight of 235 g (nominal).

The preform was placed as a single stack in a convection oven. Air heated to 320° C. was forced through the stack at a rate of 106.68 m/min for 60 seconds to melt the PET resin. The preform was then transferred to a 25.4 cm (10 inches) diameter compression mold for 1 minute at a nominal mold temperature of 170° C. The mold pressure was controlled at 13.7891 MPa (2000 psi). The final mold closure rate was 2.032 m/min (80 inches/min). The mold was then opened and the part removed and allowed to cool.

The procedure described above was repeated except the sheet material was cut into 15.24×15.24 cm (6 inches×6 inches) square preform pieces covering approximately 48% of the net surface area of the compression mold.

A stylus type profilometer (Sutronic Model No. 3 with a stylus head and probe having a diameter of 0.1016 mm (0.004 inch) was used to measure the amplitude and frequency of any ripples formed in the molded parts. The measurements obtained are shown in Table 1.

TABLE 1

| CHARGE SHAPE | SHEAR EDGE RING DIAMETER (cm) | (inch) | GAP DISTANCE (mm) | (inch) | AVERAGE FREQUENCY (mm) | (inch) | AVERAGE AMPLITUDE (mm) | (inch) |
|---|---|---|---|---|---|---|---|---|
| Round  | 25.4  | 10.0   | 0.000 |       | 3.327 | 10.131 | 0.0114 | 0.00045 |
| Square | 25.4  | 10.0   | 0.000 |       | 3.150 | 0.124  | 0.0086 | 0.00034 |
| Round  | 25.43 | 10.010 | 0.127 | 0.005 | 2.794 | 0.110  | 0.0083 | 0.00033 |
| Square | 25.43 | 10.010 | 0.127 | 0.005 | 3.124 | 0.123  | 0.0081 | 0.00032 |
| Round  | 25.45 | 10.020 | 0.254 | 0.010 | 3.505 | 0.138  | 0.0053 | 0.00021 |
| Square | 25.45 | 10.020 | 0.254 | 0.010 | 2.515 | 0.099  | 0.0081 | 0.00032 |
| Round  | 25.48 | 10.030 | 0.381 | 0.015 | 1.321 | 0.052  | 0.0036 | 0.0014  |
| Square | 25.48 | 10.030 | 0.508 | 0.015 | 3.378 | 0.133  | 0.0056 | 0.00022 |
| Round  | 25.5  | 10.040 | 0.508 | 0.020 | 0     |        | Flat   |         |
| Square | 25.5  | 10.040 | 0.508 | 0.020 | 0     |        | Flat   |         |
| Round  | 25.53 | 10.050 | 0.635 | 0.025 | 0     |        | Flat   |         |
| Square | 25.53 | 10.050 | 0.635 | 0.025 | 0     |        | Flat   |         |
| Round  | 25.55 | 10.060 | 0.762 | 0.030 | 0     |        | Flat   |         |
| Square | 25.55 | 10.060 | 0.762 | 0.030 | 0     |        | Flat   |         |

Parts made according to the present invention show no wrinkles and have a smooth surface.

What is claimed:

1. A method of making a part having a smooth surface by compression molding a charge of reinforced molding material containing a thermoplastic resin, said method comprising:

(a) opening a mold having a first die and a second die with opposing molding surfaces that cooperate to define a mold cavity having a shape corresponding to the desired shape of the part;

(b) placing a heated charge heated above the melting point of the resin of said molding material on the molding surface of one or said dies;

(c) closing said mold to compress said charge and fill the mold cavity forming a flow front of said charge, said first and second dies having an edge boundary wherein one edge of said first die is separated from a corresponding edge of the second die by a gap for accepting a quantity of molding material from said flow front, said quantity being sufficient to dissipate residual energy of the flow front to prevent rebounding of the molding material as it engages said edge boundary;

(d) allowing said charge to solidify; and (e) separating said first and second die and removing a smooth surfaced part.

2. The method of claim 1 wherein said charge is fiber reinforced.

3. The method of claim 2 wherein said fiber reinforcement is glass fiber.

4. The method of claim 1 wherein said thermoplastic resin is polyethylene terephthalate.

5. The method of claim 1 wherein the edges of said first and second dies are spaced 0.381 to 0.762 mm apart.

6. A method of fabricating a large surfaced shaped structure by compression molding a charge of reinforced molding material containing a thermoplastic resin, said method comprising the steps of:

(a) positioning a heated mold charge heated above the melting point of the resin comprised of a moldable thermoplastic resin and reinforcing fiber in a mold having opposed molding surfaces wherein said surfaces form a mold cavity having peripheral edges which are spaced apart to provide a shear gap along the periphery of said mold;

(b) compressing said mold charge to fill said mold cavity, forming a flow front of said mold charge and forcing a quantity of said charge into said shear gap, the quantity of the charge being sufficient to permit dissipation of residual energy from said flow front as it is forced into said shear gap; and (c) removing a smooth surfaced shaped structure from said mold.

7. The method of claim 6 wherein said fiber reinforcement is glass fiber.

8. The method of claim 6 wherein said thermoplastic resin is polyethylene terephthalate.

9. The method of claim 8 wherein the edges of said first and second dies are spaced 0.381 to 0.762 mm apart.

* * * * *